Patented Jan. 14, 1930

1,744,001

UNITED STATES PATENT OFFICE

WILLIAM L. OWEN, OF BATON ROUGE, LOUISIANA, ASSIGNOR, BY MESNE ASSIGNMENTS TO THE CITIZENS OF THE UNITED STATES

FERMENTATION PROCESS

No Drawing.   Application filed December 21, 1927. Serial No. 241,734.

(GRANTED UNDER THE ACT OF MARCH 3, 1883, 22 STAT. L., 625)

This application is made under act of March 3, 1883, chapter 143 (22 Stat. 625) and the invention herein described and claimed may be used by the Government of the United States or any of its officers or employees in the prosecution of the work for the Government, or by any other person in the United States, without payment to me of any royalty thereon.

My invention relates particularly to the employment of carbon produced from distillery slops to accelerate fermentation processes.

It has been known for some time that the addition of inert substances such as charcoal, paper or boneblack, tends to accelerate the rate of fermentation of sugar solutions by yeast. This has been attributed to various causes, viz, to the more rapid elimination of $CO_2$ from the solution by the presence of the inert substance; to the maintenance of a better agitation of the fermenting liquid, resulting in a better suspension of the yeast cells and to the absorption of aldehydes, or toxic substances. I have, however, used this principle on a practical basis, a process to make possible the fermentation of very concentrated molasses worts. By the use of 5% of vegetable carbons such as those used in the sugar industry, or charcoal, I have been able to ferment in the time usually required to ferment a wort of 17-20 Brix, worts of 35 to 40 Brix. The procedure is as follows:

The yeast culture is propagated as under ordinary conditions in an appropriate yeast apparatus. When the Brix of the wort in the apparatus has been reduced by one-half, the seed is then transferred to a seed vat. This vat, which contains 5% by volume of the carbon, based on the volume of wort to be fermented in the main fermenters, receives sufficient of the yeast from the apparatus to thoroughly moisten this carbon. The seed yeast is allowed to remain in contact with the absorbing substance for 30 minutes, after which time the vat is filled with freshly sterilized wort, and the entire content allowed to ferment until the density is reduced to one-half of its original density. The entire contents of the vat is then transferred to the fermenter which is set up at 30-40 Brix. The fermentation will be found to proceed rapidly and will be completed within 72 hours, or even in less time. It is not necessary to separate off the carbon, but it is an advantage to carry the contents of the fermenter to the stills. After distilling off the alcohol, the slops which will be 20 Brix, are conveyed to evaporators and the remaining water evaporated off. The heavy concentrated slops are then conveyed to a suitable retort and burned to a carbon with air excluded. The carbon is then finely divided in a pulp mill and leached with several volumes of boiling water, when it is filtered, dried and again used in the process.

As this carbon contains from 70-80% ash, which is very rich in potash and phosphoric acid, it can be very readily converted into a fertilizer by ashing it after it has become too rich in ash to warrant its further use as an accelerant of fermentation.

I claim:

A fermentation process which comprises the propagation of yeast culture, the Brix of the wort being reduced 50%, the transfer of the seed to a seed vat that contains 5% by volume of a vegetable carbon based on the volume of the wort to be fermented, the holding of the seed yeast in the seed vat for approximately thirty minutes, the addition thereafter to the seed vat of freshly sterilized wort, the fermentation of the entire contents of said seed vat until the density thereof is reduced to one-half of its original density, the subsequent transfer of the contents of the seed vat to a fermenter which is operated at 30-40 Brix until fermentation is complete.

WILLIAM L. OWEN.